United States Patent
Abe et al.

(10) Patent No.: US 11,319,908 B2
(45) Date of Patent: May 3, 2022

(54) SADDLE RIDING VEHICLE

(71) Applicant: HONDA MOTOR CO, LTD., Tokyo (JP)

(72) Inventors: Yuta Abe, Tokyo (JP); Hiromasa Okada, Tokyo (JP)

(73) Assignee: HONDA MOTOR CO. LTD., Tokyo (JP)

( * ) Notice: Subject to any disclaimer, the term of this patent is extended or adjusted under 35 U.S.C. 154(b) by 0 days.

(21) Appl. No.: 17/005,546

(22) Filed: Aug. 28, 2020

(65) Prior Publication Data

US 2021/0078663 A1    Mar. 18, 2021

(30) Foreign Application Priority Data

Sep. 12, 2019   (JP) .............................. JP2019-166176

(51) Int. Cl.
| | | |
|---|---|---|
| *F01N 13/08* | (2010.01) | |
| *F02M 35/04* | (2006.01) | |
| *B62K 11/04* | (2006.01) | |
| *B62J 40/10* | (2020.01) | |
| *F02M 35/16* | (2006.01) | |

(Continued)

(52) U.S. Cl.
CPC ............ *F02M 35/048* (2013.01); *B62J 40/10* (2020.02); *B62K 11/04* (2013.01); *F02M 35/162* (2013.01); *F01N 13/082* (2013.01); *F01N 13/1822* (2013.01); *F01N 2260/20* (2013.01);
(Continued)

(58) Field of Classification Search
CPC .. B62J 40/10; F01N 2340/04; F01N 2590/04; F02M 35/048; F02M 35/10288; F02M 35/162
See application file for complete search history.

(56) References Cited

U.S. PATENT DOCUMENTS

| | | | | |
|---|---|---|---|---|
| 2005/0133289 A1* | 6/2005 | Nakano | ................ | F02M 35/048 180/219 |
| 2012/0205191 A1* | 8/2012 | Matsushima | ....... | F01N 13/1805 181/227 |

(Continued)

FOREIGN PATENT DOCUMENTS

| | | |
|---|---|---|
| JP | 2005-161951 | 6/2005 |
| JP | 2008-064068 | 3/2008 |
| JP | 2013-204515 | 10/2013 |

OTHER PUBLICATIONS

Japanese Office Action dated Aug. 3, 2021, English translation included, 7 pages.
Indian Office Action dated Jul. 8, 2021, 6 pages.

*Primary Examiner* — Jonathan R Matthias
(74) *Attorney, Agent, or Firm* — Rankin, Hill & Clark LLP

(57) ABSTRACT

A saddle riding vehicle includes a body frame, an exhaust pipe, a muffler, and a catalyst. The body frame includes a main frame, a seat frame that extends rearward from the main frame and supports a seat for occupant, and a rear frame that extends from the main frame upward to a rear and is connected to the seat frame. The exhaust pipe extends rearward of the vehicle from an exhaust port of an engine. The muffler is connected to a rear end portion of the exhaust pipe. The catalyst is disposed in the muffler. An air cleaner box is disposed rearward of the engine. The catalyst disposed in the muffler is disposed in a space surrounded by the main frame, the seat frame, and the rear frame and overlaps with the air cleaner box as viewed in a side view of the vehicle.

10 Claims, 9 Drawing Sheets

(51) Int. Cl.
*F01N 13/18* (2010.01)
*F02M 35/10* (2006.01)

(52) U.S. Cl.
CPC ...... *F01N 2340/04* (2013.01); *F01N 2590/04* (2013.01); *F02M 35/10288* (2013.01)

(56) References Cited

U.S. PATENT DOCUMENTS

| | | | |
|---|---|---|---|
| 2013/0180798 A1* | 7/2013 | Matsushima | F01N 13/0097 181/228 |
| 2013/0259760 A1* | 10/2013 | Kobayashi | F01N 13/0093 422/170 |
| 2015/0113984 A1* | 4/2015 | Shibano | F02M 35/162 60/605.1 |
| 2016/0318569 A1 | 11/2016 | Zellmer et al. | |
| 2018/0094601 A1* | 4/2018 | Okada | F02B 61/02 |
| 2019/0257276 A1 | 8/2019 | Singh | |

* cited by examiner

SADDLE RIDING VEHICLE

INCORPORATION BY REFERENCE

The present application claims priority under 35 U.S.C. § 119 to Japanese Patent Application No. 2019-166176 filed on Sep. 12, 2019. The content of the application is incorporated herein by reference in its entirety.

TECHNICAL FIELD

The present invention relates to a saddle riding vehicle.

BACKGROUND ART

There has been conventionally known a saddle riding vehicle in which an exhaust pipe extending in a vehicle front-rear direction is passed through between an engine and main frames and catalysts are disposed in respective exhaust pipe and muffler (for example, see Patent Literature 1). In Patent Literature 1, the catalyst disposed in the exhaust pipe is disposed at a position overlapping with the main frames as viewed in a side view of the vehicle, which is a position close to legs of an occupant.

CITATION LIST

Patent Literature

[Patent Literature 1] JP-A No. 2008-64068

SUMMARY OF INVENTION

Technical Problem

However, since the catalyst becoming a high temperature is close to the legs of the occupant in the conventional saddle riding vehicle, the catalyst is desired to be disposed separately from the occupant. Additionally, since the main frames overlap with the catalyst from outside as viewed in the side view of the vehicle in the conventional saddle riding vehicle, ensuring a large space to dispose the catalyst is difficult, and assembly of an exhaust system is probably reduced.

The present invention has been made in consideration of the above-described circumstances, and its object is to ensure disposing a catalyst separately from an occupant and to ensure disposing the catalyst compactly in a saddle riding vehicle.

Solution to Problem

A saddle riding vehicle includes a body frame (10), an engine (11), an exhaust pipe (35), a muffler (36), and a catalyst (57). The body frame (10) includes a main frame (16) that extends rearward from a head pipe (15), a seat frame (19) that extends rearward from the main frame (16) and supports a seat (14) for occupant, and a rear frame (20) that extends from the main frame (16) upward to a rear and is connected to the seat frame (19). The engine (11) is supported to the body frame (10). The exhaust pipe (35) extends rearward of the vehicle from an exhaust port of the engine (11). A muffler (36) is connected to a rear end portion (35a) of the exhaust pipe (35). A catalyst (57) is disposed in the muffler (36). An air cleaner box (41) that takes in intake air supplied to the engine (11) is disposed rearward of the engine (11). The catalyst (57) disposed in the muffler (36) is disposed in a space (70) surrounded by the main frame (16), the seat frame (19), and the rear frame (20) and overlaps with the air cleaner box (41) as viewed in a side view of the vehicle.

Additionally, in the above-described configuration, the catalyst (57) may overlap with the air cleaner box (41) as seen in a plan view viewed in a vehicle up-down direction.

Additionally, the present invention is a saddle riding vehicle that includes a body frame (10), an engine (11), an exhaust pipe (35), a muffler (36), and a catalyst (57). The body frame (10) includes a main frame (16) that extends rearward from a head pipe (15), a seat frame (19) that extends rearward from the main frame (16) and supports a seat (14) for occupant, and a rear frame (20) that extends from the main frame (16) upward to a rear and is connected to the seat frame (19). The engine (11) is supported to the body frame (10). The exhaust pipe (35) extends rearward of the vehicle from an exhaust port of the engine (11). A muffler (36) is connected to a rear end portion (35a) of the exhaust pipe (35). A catalyst (57) is disposed in the muffler (36). An air cleaner box (41) that takes in intake air supplied to the engine (11) is disposed rearward of the engine (11). The catalyst (57) disposed in the muffler (36) is disposed in a space (70) surrounded by the main frame (16), the seat frame (19), and the rear frame (20) as viewed in a side view of the vehicle and disposed in a concave portion (81) disposed in the air cleaner box (41).

Additionally, in the above-described configuration, the muffler (36) may be fastened to the rear end portion (35a) of the exhaust pipe (35) with a fastening portion (60). The fastening portion (60) may be disposed forward of the main frame (16) as viewed in the side view of the vehicle.

Furthermore, in the above-described configuration, the air cleaner box (41) may include a duct (74). The duct (74) may introduce the intake air to inside the air cleaner box (41). The air cleaner box (41) may include a lower wall portion (78) and an outer wall portion (79). The lower wall portion (78) may receive the intake air introduced from the duct (74) to the air cleaner box (41). The outer wall portion (79) may extend outside in a vehicle width direction and upward from the lower wall portion (78). The catalyst (57) may be disposed below the outer wall portion (79).

Additionally, in the above-described configuration, the outer wall portion (79) may curve so as to be positioned outside in the vehicle width direction toward upward.

Additionally, in the above-described configuration, the outer wall portion (79) may include a first curving portion (79a) and a second curving portion (79b). The first curving portion (79a) may rise from the lower wall portion (78). The second curving portion (79b) may inflect upward of the first curving portion (79a) and extend outside in a vehicle width direction and upward. The first curving portion (79a) may curve so as to increase an inclination toward upward. The second curving portion (79b) may curve so as to decrease an inclination toward upward.

Additionally, in the above-described configuration, the catalyst (57) may overlap with the outer wall portion (79) from the outside in the vehicle width direction.

Additionally, in the above-described configuration, the air cleaner box (41) may house an air cleaner element (71) that purifies the intake air. The air cleaner box (41) may include an opening (76) and a lid (77). The opening (76) may be configured to allow the air cleaner element (71) to be loaded or unloaded therethrough. The lid (77) may close the opening (76). The opening (76) may be disposed above the catalyst (57) and open to outside in a vehicle width direction from the space (70).

Additionally, in the above-described configuration, in the muffler (36), a second catalyst (58) may be disposed rearward of the catalyst (57).

Additionally, in the above-described configuration, a catalyst cover (67) and a body cover (45) may be disposed. The catalyst cover (67) may cover the catalyst (57) from outside the muffler (36). The body cover (45) may cover the air cleaner box (41) from outside in a vehicle width direction. The body cover (45) may include an extending portion (45a) that covers the catalyst cover (67) from the outside in the vehicle width direction.

Advantageous Effects of Invention

The saddle riding vehicle includes the body frame, the engine, the exhaust pipe, the muffler, and the catalyst. The body frame includes the main frame that extends rearward from the head pipe, the seat frame that extends rearward from the main frame and supports the seat for occupant, and the rear frame that extends from the main frame upward to the rear and is connected to the seat frame. The engine is supported to the body frame. The exhaust pipe extends rearward of the vehicle from the exhaust port of the engine. The muffler is connected to the rear end portion of the exhaust pipe. The catalyst is disposed in the muffler. The air cleaner box that takes in the intake air supplied to the engine is disposed rearward of the engine. The catalyst disposed in the muffler is disposed in the space surrounded by the main frame, the seat frame, and the rear frame and overlaps with the air cleaner box as viewed in the side view of the vehicle.

With this configuration, as viewed in the side view of the vehicle, the catalyst is disposed in the space surrounded by the main frame, the seat frame, and the rear frame, and therefore the catalyst can be disposed separately from the occupant. Furthermore, the catalyst overlaps with the air cleaner box as viewed in the side view of the vehicle, and therefore the catalyst can be disposed compactly using the space at a side of the air cleaner box.

Additionally, in the above-described configuration, the catalyst may overlap with the air cleaner box as seen in the plan view viewed in the vehicle up-down direction.

With this configuration, the catalyst can be disposed compactly.

Additionally, the present invention is the saddle riding vehicle that includes the body frame, the engine, the exhaust pipe, the muffler, and the catalyst. The body frame includes the main frame that extends rearward from the head pipe, the seat frame that extends rearward from the main frame and supports the seat for occupant, and the rear frame that extends from the main frame upward to the rear and is connected to the seat frame. The engine is supported to the body frame. The exhaust pipe extends rearward of the vehicle from the exhaust port of the engine. The muffler is connected to the rear end portion of the exhaust pipe. The catalyst is disposed in the muffler. The air cleaner box that takes in the intake air supplied to the engine is disposed rearward of the engine. The catalyst disposed in the muffler is disposed in the space surrounded by the main frame, the seat frame, and the rear frame as viewed in the side view of the vehicle and disposed in the concave portion disposed in the air cleaner box.

With this configuration, as viewed in the side view of the vehicle, the catalyst is disposed in the space surrounded by the main frame, the seat frame, and the rear frame, and therefore the catalyst can be disposed separately from the occupant. Furthermore, the catalyst is disposed in the concave portion disposed in the air cleaner box, and therefore the catalyst can be disposed compactly using the space of the concave portion.

Additionally, in the above-described configuration, the muffler may be fastened to the rear end portion of the exhaust pipe with the fastening portion. The fastening portion may be disposed forward of the main frame as viewed in the side view of the vehicle.

With this configuration, the main frame is less likely to be a hindrance of the fastening portion of the muffler and assembility of the muffler is good.

Furthermore, in the above-described configuration, the air cleaner box may include the duct. The duct may introduce the intake air to inside the air cleaner box. The air cleaner box may include the lower wall portion and the outer wall portion. The lower wall portion may receive the intake air introduced from the duct to the air cleaner box. The outer wall portion may extend outside in the vehicle width direction and upward from the lower wall portion. The catalyst may be disposed below the outer wall portion.

With this configuration, a flow of the intake air introduced from the duct to the air cleaner box can be mixed by the lower wall portion and the outer wall portion, and the intake air can be efficiently made to flow inside the air cleaner box. Moreover, using a space below the outer wall portion, the catalyst can be disposed compactly.

Additionally, in the above-described configuration, the outer wall portion may curve so as to be positioned outside in the vehicle width direction toward upward.

With this configuration, since the outer wall portion curves, the flow of the intake air can be efficiently mixed.

Additionally, in the above-described configuration, the outer wall portion may include the first curving portion and the second curving portion. The first curving portion may rise from the lower wall portion. The second curving portion may inflect upward of the first curving portion and extend outside in the vehicle width direction and upward. The first curving portion may curve so as to increase the inclination toward upward. The second curving portion may curve so as to decrease the inclination toward upward.

With this configuration, the first curving portion and the second curving portion allow efficiently flowing the intake air inside the air cleaner box, and the space can be ensured at a side of the first curving portion and the second curving portion and therefore the catalyst can be easily disposed.

Additionally, in the above-described configuration, the catalyst may overlap with the outer wall portion from the outside in the vehicle width direction.

With this configuration, the catalyst can be disposed compactly in a side of the outer wall portion.

Additionally, in the above-described configuration, the air cleaner box may house the air cleaner element that purifies the intake air. The air cleaner box may include the opening and the lid. The opening may be configured to allow the air cleaner element to be loaded or unloaded therethrough. The lid may close the opening. The opening may be disposed above the catalyst and open to outside in the vehicle width direction from the space.

With this configuration, the air cleaner element can be loaded or unloaded from the air cleaner box through the opening above the catalyst and therefore maintainability is good.

Additionally, in the above-described configuration, in the muffler, the second catalyst may be disposed rearward of the catalyst.

With this configuration, exhaust air that has passed through the catalyst passes through the second catalyst, and this allows efficiently purifying the exhaust air. The second catalyst is positioned further rearward of the catalyst, and therefore the second catalyst can be disposed far from the occupant.

Additionally, in the above-described configuration, the catalyst cover and the body cover may be disposed. The catalyst cover may cover the catalyst from outside the muffler. The body cover may cover the air cleaner box from outside in the vehicle width direction. The body cover may include the extending portion that covers the catalyst cover from the outside in the vehicle width direction.

With this configuration, since the body cover that covers the air cleaner box covers the catalyst cover, heat of the catalyst reaching to the occupant can be effectively reduced with the simple structure.

DESCRIPTION OF EMBODIMENTS

The following describes an embodiment of the present invention with reference to the drawings. In the description, descriptions on directions such as front and rear, right and left, and upper and lower are identical to directions with respect to a vehicle body insofar as descriptions are not particularly given. A reference sign FR illustrated in each drawing indicates a front side of the vehicle body, a reference sign UP indicates an upper side of the vehicle body, and a reference sign LH indicates a left side of the vehicle body.

Figure 1:
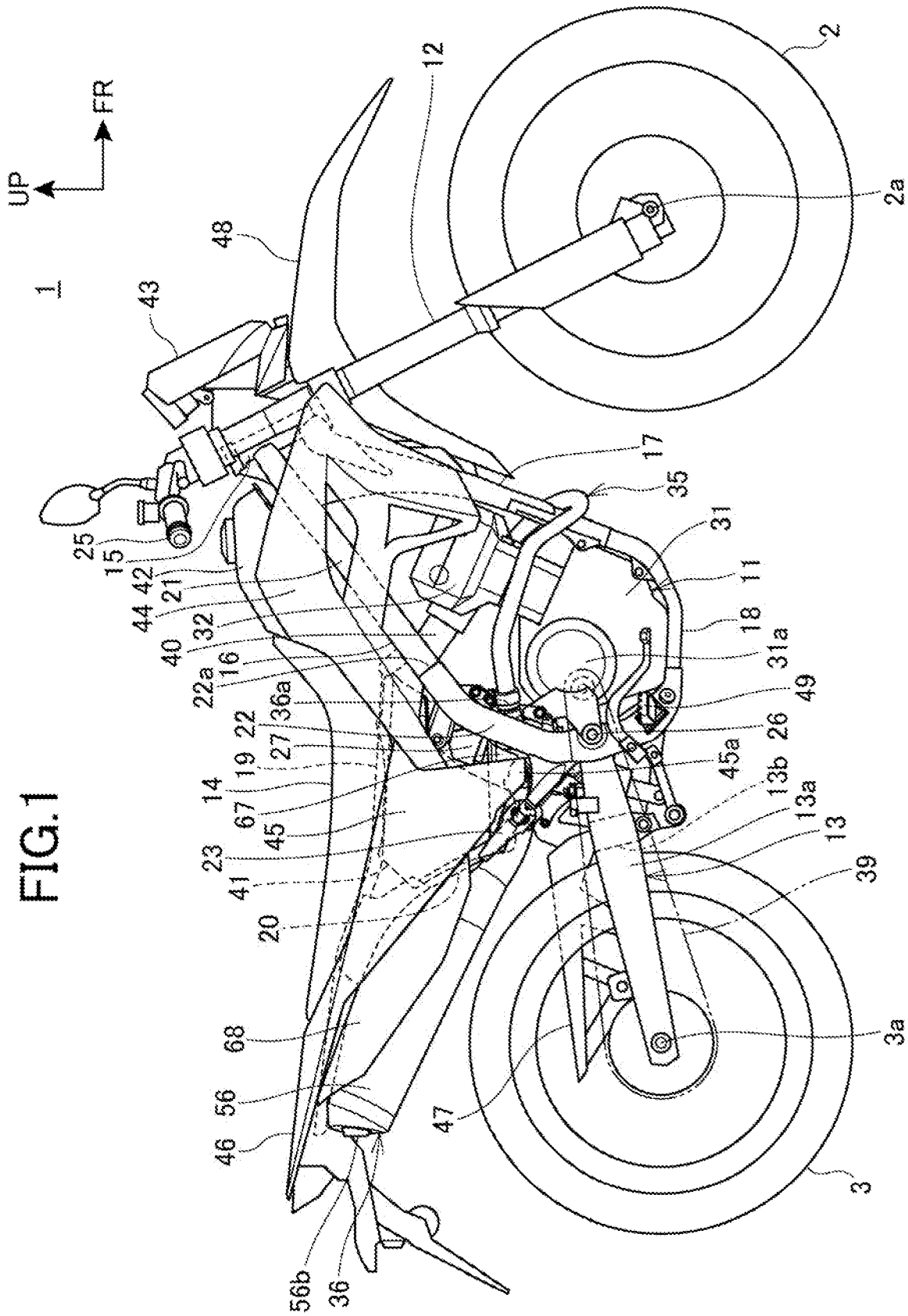
FIG. 1 is a right side view of a motorcycle according to an embodiment of the present invention.

FIG. 1 is a right side view of a motorcycle 1 according to the embodiment of the present invention.

The motorcycle 1 is a vehicle where an engine 11 as a power unit is supported to a body frame 10, a front fork 12 that steerably supports a front wheel 2 is steerably supported to a front end of the body frame 10, and a swing arm 13 is disposed on a rear portion of the body frame 10. The swing arm 13 supports a rear wheel 3.

The motorcycle 1 is a saddle riding vehicle on which an occupant is seated as straddling a seat 14. The seat 14 is disposed above the rear portion of the body frame 10.

Figure 2:
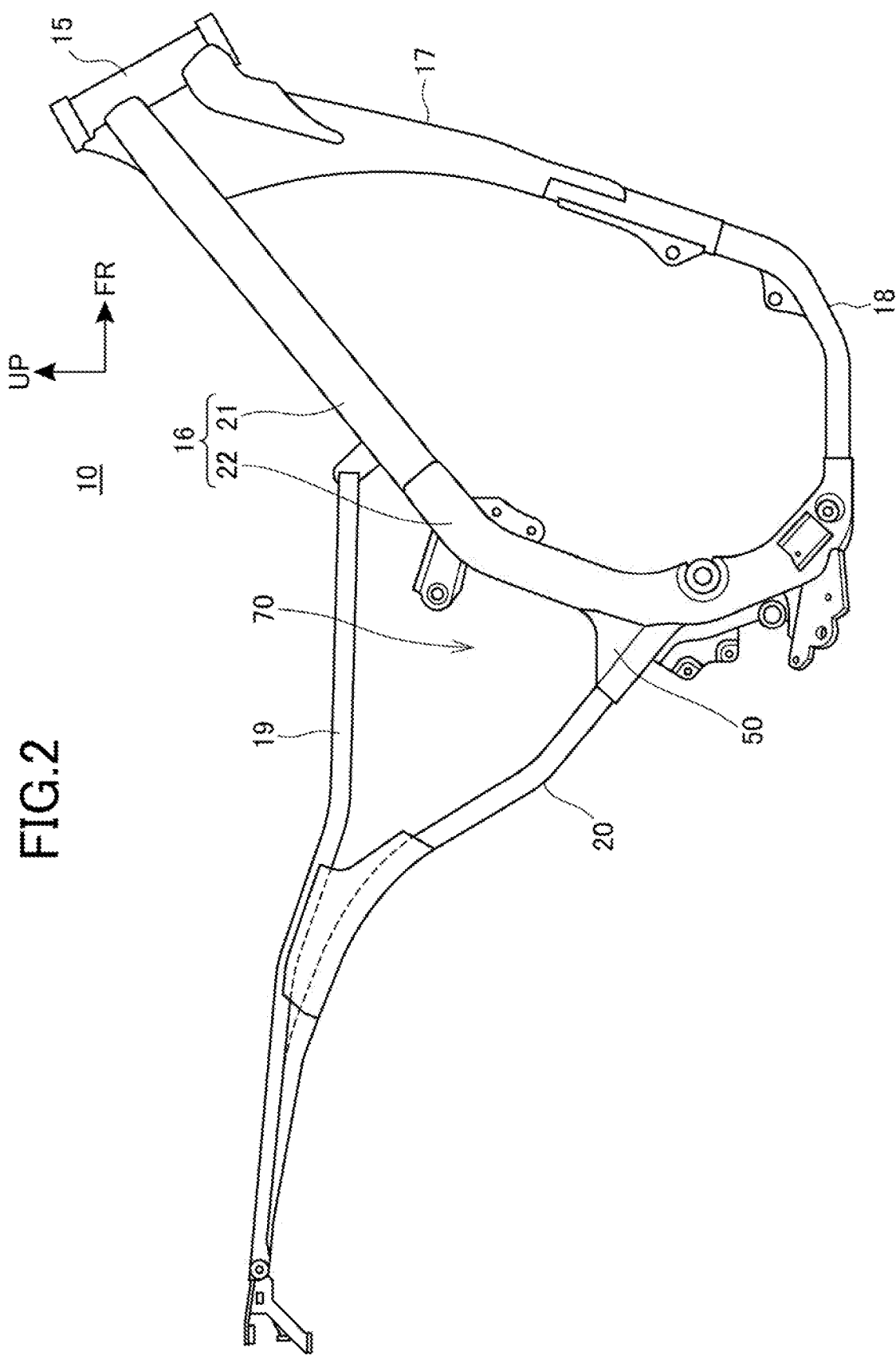
FIG. 2 is a right side view of a body frame.

FIG. 2 is a right side view of the body frame 10.

With reference to FIG. 1 and FIG. 2, the body frame 10 includes a head pipe 15, a pair of right and left main frames 16, a down frame 17, and a pair of right and left lower frames 18. The head pipe 15 is disposed on the front end of the body frame 10. The main frames 16 extend downward to the rear from the head pipe 15. The down frame 17 extends downward to the rear from the lower sides of the main frames 16 in the head pipe 15. The lower frames 18 extend rearward from the lower end portion of the down frame 17 and are each connected to the lower end portions of the right and left main frames 16.

The body frame 10 includes a pair of right and left seat frames 19, and a pair of right and left rear frames 20. The pair of right and left seat frames 19 each extend rearward from upper portions of the right and left main frames 16, and the pair of right and left rear frames 20 each extend upward to the rear from the lower portions of the right and left main frames 16 and are connected to the seat frames 19.

The head pipe 15 and the down frame 17 are positioned at a center of a vehicle width similarly to the front wheel 2.

The main frames 16 each include a main frame upper portion 21 and a pivot frame portion 22. The main frame upper portion 21 extends downward to the rear from the head pipe 15, and the pivot frame portion 22 extends downward from the lower end portion of the main frame upper portion 21.

The seat frame 19 extends rearward to be substantially horizontal from the main frame upper portion 21.

The rear frame 20 extends upward to the rear from the intermediate portion between the top and bottom of the pivot frame portion 22.

The lower frame 18 has a rear end portion connected to the lower end portion of the pivot frame portion 22.

A front fork 12 is turnably supported to the body frame 10 via a steering shaft (not illustrated) inserted through the head pipe 15. A handlebar 25 for steering is disposed on the upper end portion of the front fork 12. The front wheel 2 is journaled to an axle 2a disposed on the lower end portion of the front fork 12.

The swing arm 13 is journaled to a pivot shaft 26 supported to the right and left pivot frame portions 22. The pivot shaft 26 extends horizontally in a vehicle width direction.

The swing arm 13 includes a pair of right and left arm portions 13a and a cross member 13b. The pair of right and left arm portions 13a extend in a vehicle front-rear direction on right and left of the rear wheel 3. The cross member 13b connects the right and left arm portions 13a in front of the rear wheel 3.

In the swing arm 13, front end portions of the arm portions 13a disposed between the right and left pivot frame portions 22 are journaled to the pivot shaft 26 and swing up and down around the pivot shaft 26.

The rear wheel 3 is journaled to an axle 3a disposed on rear end portions of the right and left arm portions 13a.

The motorcycle 1 includes a rear suspension 27 bridged between the front portion of the swing arm 13 and the body frame 10. The rear suspension 27 is disposed between the right and left arm portions 13a in front of the cross member 13b and positioned at the center of the vehicle width.

The engine 11 is disposed between the down frame 17 and the pivot frame portions 22 in the vehicle front-rear direction below the main frame upper portions 21 and fixed to the body frame 10.

The engine 11 includes a crankcase 31 and a cylinder portion 32. The crankcase 31 supports a crankshaft (not illustrated), which horizontally extends in the vehicle width direction (right-left direction). The cylinder portion 32 is disposed on the upper portion of the front portion of the crankcase 31.

An exhaust pipe 35 of the engine 11 is pulled out downward from an exhaust port in the front surface of the cylinder portion 32 and extends rearward. A muffler 36 is connected to the downstream end of the exhaust pipe 35.

The rear portion of the crankcase 31 is a transmission case portion 31a that houses a transmission. An output from the engine 11 is transmitted to the rear wheel 3 with a driving chain 39 that connects an output shaft of the transmission with the rear wheel 3.

A throttle body 40 that adjusts an intake volume is mounted to an intake port in the front surface of the cylinder portion 32.

An air cleaner box 41 that takes in intake air supplied to the engine 11 is disposed rearward of the cylinder portion 32 and the throttle body 40.

A fuel tank 42 is disposed above the main frames 16 and between the head pipe 15 and the seat 14.

The motorcycle 1 includes a front cover 43 that covers the head pipe 15 from the front side, a pair of right and left front side covers 44 that cover the upper portion of the front portion of the body frame 10 and the fuel tank 42 from sides, a pair of right and left rear side covers 45 (vehicle body covers) that cover the vehicle body below the seat 14 from sides, and a rear cover 46 that covers the vehicle body at the rear of the seat 14 from upward.

The motorcycle 1 includes a chain cover 47 that covers the driving chain 39.

A front fender 48 that covers the front wheel 2 from above is mounted to the front fork 12.

A pair of right and left steps 49 on which the occupant seated on the seat 14 places feet are mounted to lower end portions of the right and left pivot frame portions 22 and positioned downward in front of the pivot shaft 26.

With the feet placed on the steps 49, legs of the occupant pass through outer lateral sides of the pivot frame portions 22 and extend to the seat 14 side above so as to run along from the steps 49 to the pivot frame portions 22.

A pair of right and left tandem steps 23 on which a pillion passenger seated on the rear portion of the seat 14 places feet are disposed on outer surfaces in the vehicle width direction on lower portions of the rear frames 20.

Figure 3:
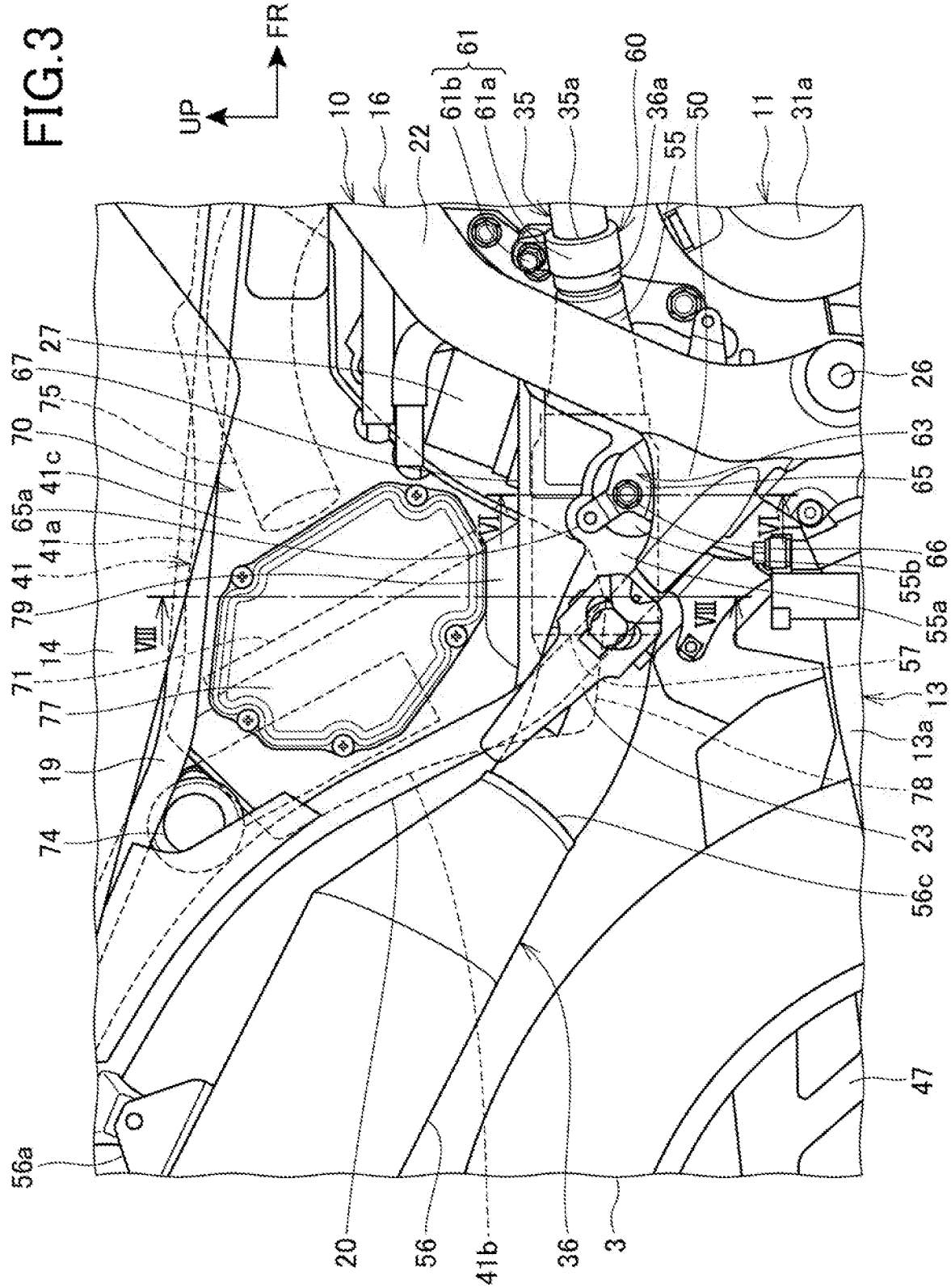
FIG. 3 is a right side view of an intermediate portion between a front and a rear of the motorcycle.

FIG. 3 is a right side view of an intermediate portion between the front and rear of the motorcycle 1. FIG. 3 illustrates a state in which the front side covers 44 and the rear side covers 45 are removed.

The pivot frame portions 22 of the main frames 16 extend up and down at the rear of the engine 11 as viewed in the side view of the vehicle.

The pivot frame portion 22 includes a connecting portion 50 to which the front end portion of the rear frame 20 is connected.

The connecting portion 50 protrudes rearward from the rear portion of the pivot frame portion 22 as viewed in the side view of the vehicle. As viewed in the side view of the vehicle, the connecting portion 50 is formed in a triangular shape tapered off from the pivot frame portion 22 side to the rear. The connecting portion 50 is disposed at the intermediate portion between the top and bottom of the pivot frame portion 22 and positioned on the rear and upward of the pivot shaft 26.

The rear frame 20 is inserted into the rear end portion of the connecting portion 50 from the rear. The rear frame 20 extends upward to the rear from the connecting portion 50 and is connected to the seat frame 19.

With reference to FIG. 1 and FIG. 3, after the exhaust pipe 35 extends downward to the front from the front surface of the cylinder portion 32, the exhaust pipe 35 turns back in a U shape outside in the vehicle width direction and rearward, passes through one side (right side) of the cylinder portion 32, and extends rearward.

A rear end portion 35a of the exhaust pipe 35 is positioned above the transmission case portion 31a as viewed in the side view of the vehicle, and positioned forward of the pivot frame portions 22 and rearward of the cylinder portion 32 in the vehicle front-rear direction. The rear end portion 35a is positioned outside of the cylinder portion 32 and inside of the pivot frame portions 22 in the vehicle width direction.

An upstream end 36a in a flow of exhaust air of the muffler 36 is connected to a rear end portion 35a of the exhaust pipe 35.

The muffler 36 extends rearward through the inside in the vehicle width direction with respect to the pivot frame portions 22 and the rear frames 20.

Figure 4:
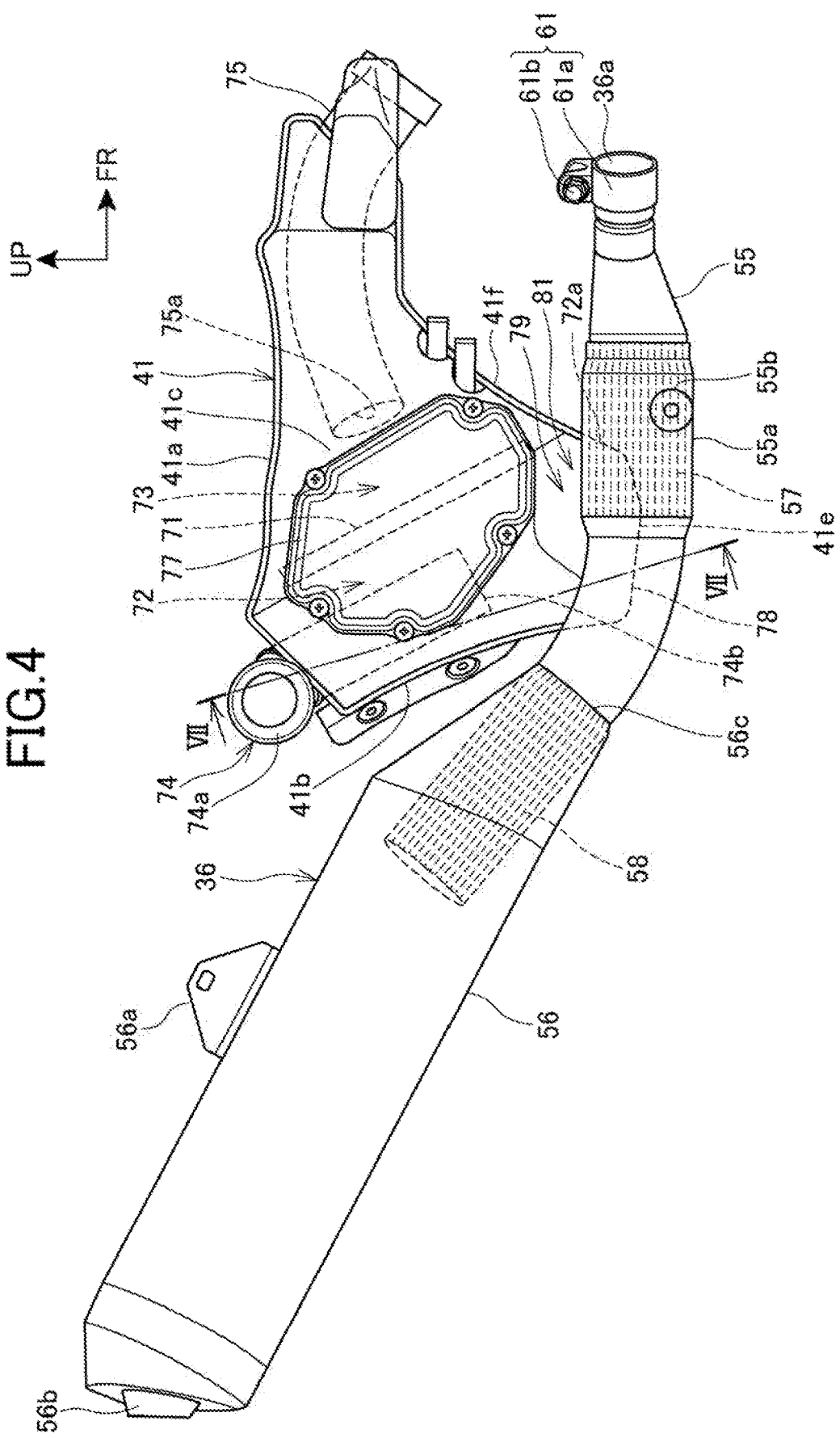
FIG. 4 is a side view when a muffler and an air cleaner box on a right side are viewed from outside in a vehicle width direction.

FIG. 4 is a side view when the muffler 36 and the air cleaner box 41 on the right side are viewed from the outside in the vehicle width direction. FIG. 4 does not illustrate a catalyst cover 67 described later.

With reference to FIG. 3 and FIG. 4, the muffler 36 includes a rear extension pipe 55 and a muffler body portion 56. The rear extension pipe 55 extends rearward from the rear end portion 35a of the exhaust pipe 35. The muffler body portion 56 is connected to the rear portion of the rear extension pipe 55.

The rear extension pipe 55 has a front portion extending substantially horizontal in the front-rear direction as viewed in the side view of the vehicle. The rear extension pipe 55 has a rear portion extending upward to the rear as viewed in the side view of the vehicle.

A catalyst holder 55a that holds a catalyst 57 is disposed on a front portion of the rear extension pipe 55 and at the rear (downstream) of the upstream end 36a. The catalyst holder 55a is a tubular portion formed to have a diameter larger than those of parts continuous with the front and the rear of the catalyst holder 55a in the rear extension pipe 55 and internally holds the catalyst 57.

Additionally, a second catalyst 58 is housed in the rear end portion of the rear extension pipe 55 and downstream of the catalyst 57. That is, the catalyst 57 and the second catalyst 58 are supported in the rear extension pipe 55.

The catalyst 57 and the second catalyst 58 each include a tubular catalytic case and a catalyzer housed in this catalytic case. This catalyzer is formed such that an exhaust gas can flow, and the catalyzer supports a catalytic material (for example, platinum, rhodium, and palladium) that decomposes an exhaust gas component.

A front side fixing portion 55b that protrudes outside in the vehicle width direction is disposed on an outer surface at a lower portion of the front portion of the catalyst holder 55a as viewed in the side view of the vehicle. The front side fixing portion 55b is positioned on the upper side of the connecting portions 50 of the body frame 10.

The muffler body portion 56 is a tubular body having a diameter larger than that of the rear extension pipe 55. The muffler body portion 56 includes a plurality of expansion chambers partitioned by a partition wall disposed inside.

The rear end portion of the rear extension pipe 55 is inserted into the front end portion of the muffler body portion 56, and the second catalyst 58 is positioned inside the muffler body portion 56 while being supported by the rear extension pipe 55.

The muffler body portion 56 has an upper surface portion provided with a plate-shaped rear side fixing portion 56a extending upward.

An exhaust noise-reduced exhaust gas that has passed through the plurality of expansion chambers is discharged outside from a discharge port 56b in the rear end of the muffler body portion 56.

In the muffler body portion 56, the front end of the muffler body portion 56 is joined to the rear portion of the rear extension pipe 55 with a welded portion 56c. Since the rear extension pipe 55 and the muffler body portion 56 are integrated by welding, the rear extension pipe 55 and the muffler body portion 56 are not easily separated by, for example, releasing the fastening of, for example, a bolt, in the muffler 36.

As illustrated in FIG. 1, the muffler 36 extends from the discharge port 56b, which is positioned above the rear portion of the rear wheel 3, to the upstream end 36a, which is positioned in front of the pivot frame portions 22, and is thus relatively long in the front-rear direction.

The muffler 36 is fastened to the rear end portion 35a of the exhaust pipe 35 with a fastening portion 60 disposed on the upstream end 36a as the front end of the muffler 36.

In the fastening portion 60, the rear end portion 35a of the exhaust pipe 35 is fitted to the upstream end 36a of the muffler 36, and this fitted portion is fastened with a fastening member 61.

Here, while the rear end portion 35a is inserted into and fitted to the inner periphery of the upstream end 36a, the inner periphery of the upstream end 36a may be fitted to the inner periphery of the rear end portion 35a.

The fastening member 61 includes a band member 61a and a bolt 61b. The band member 61a is wound around the outer periphery of the upstream end 36a of the muffler 36. The bolt 61b connects mutual both ends of the band member 61a.

Clenching the bolt 61b reduces a diameter of the band member 61a. The fastening member 61 compresses the fastening portion 60 by binding force caused by reducing the diameter of the band member 61a to fasten the rear end portion 35a and the upstream end 36a.

As viewed in the side view of the vehicle, the fastening portion 60 is positioned forward of the pivot frame portions 22 and rearward of the cylinder portion 32. Additionally, as viewed in the side view of the vehicle, the fastening portion 60 is positioned above the transmission case portion 31a and below upper ends 22a (FIG. 1) of the pivot frame portions 22. In the vehicle width direction, the fastening portion 60 is positioned outside of the cylinder portion 32 and inside of the pivot frame portions 22.

Thus, since the fastening portion 60 is disposed in front of the pivot frame portions 22, the pivot frame portions 22 are less likely to be a hindrance when the fastening portion 60 is fastened, and the fastening portion 60 can be easily fastened with the fastening member 61. Moreover, since the fastening portion 60 is positioned inside of the pivot frame portions 22 in the vehicle width direction, the fastening portion 60 and the fastening member 61 can be disposed compactly in the vehicle width direction.

Figure 5:
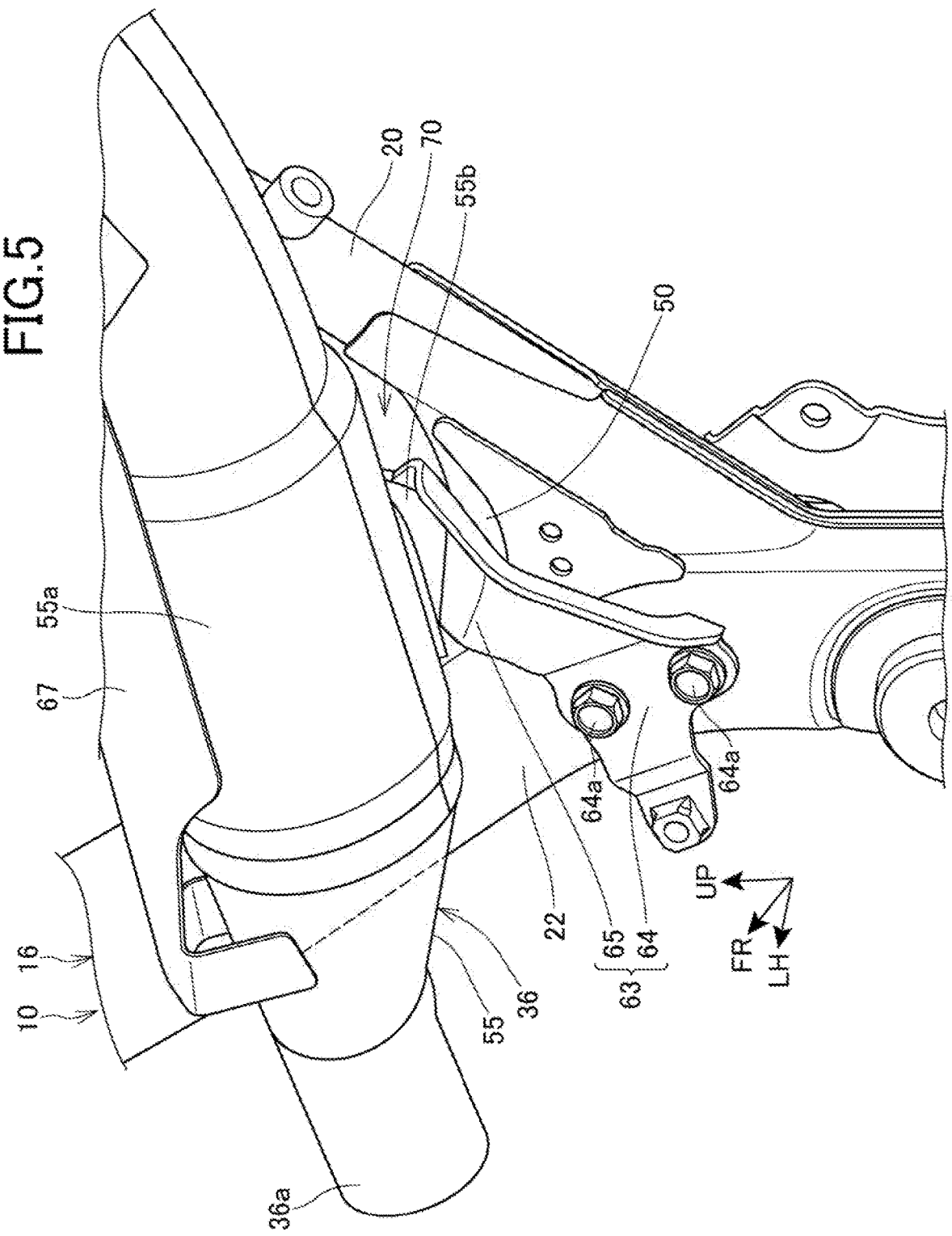
FIG. 5 is a perspective view when a fixation structure of a front portion of the muffler is viewed from inside in the vehicle width direction.
Figure 6:
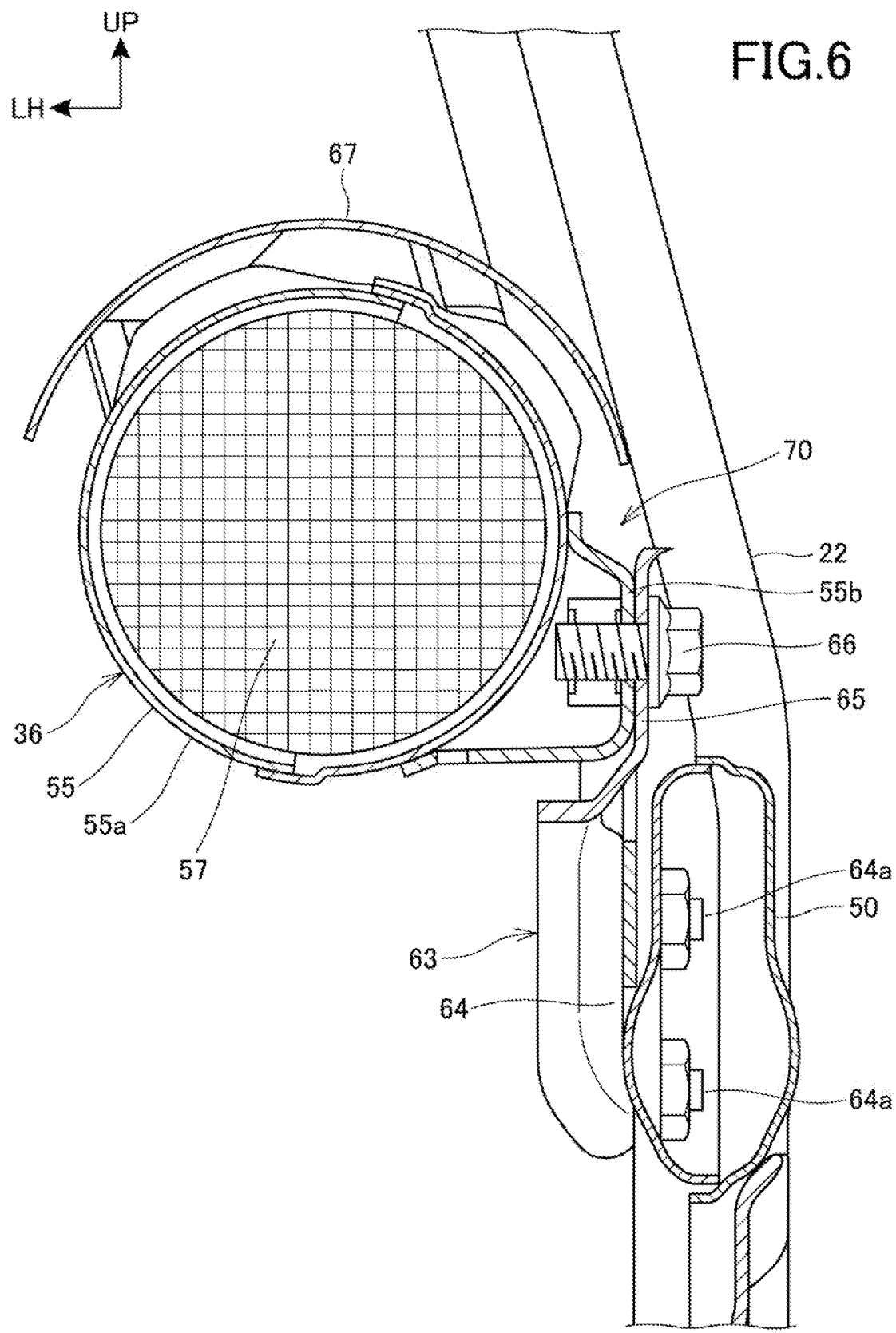
FIG. 6 is a cross-sectional view along VI-VI in FIG. 3.

FIG. 5 is a perspective view when a fixation structure of the front portion of the muffler 36 is viewed from the inside in the vehicle width direction. FIG. 6 is a cross-sectional view along VI-VI in FIG. 3.

With reference to FIG. 3, FIG. 5, and FIG. 6, the body frame 10 includes a plate-shaped muffler stay 63 that supports the front portion of the muffler 36. The muffler stay 63 is disposed upward of the pivot shaft 26.

The muffler stay 63 includes a frame fixing portion 64 and a muffler mounting portion 65. The frame fixing portion 64 is fixed to the inner surface of the pivot frame portion 22. The muffler mounting portion 65 extends upward to the rear from the frame fixing portion 64.

The frame fixing portion 64 is fastened to the inner surface of the pivot frame portion 22 with a plurality of bolts 64a inserted from the inside in the vehicle width direction.

As viewed in the side view of the vehicle, the muffler mounting portion 65 extends upward the connecting portion 50 from between the pivot frame portion 22 and the rear frame 20.

As viewed in the side view of the vehicle, the upper portion of the muffler mounting portion 65 overlaps with the front side fixing portion 55b of the muffler 36 from the outside in the vehicle width direction.

A muffler fixing bolt 66 that fixes the front portion of the muffler 36 to the muffler stay 63 is inserted into the upper portion of the muffler mounting portion 65 from the outside in the vehicle width direction and fastened to the front side fixing portion 55b.

Additionally, a cover fixing portion 65a to which the lower portion of the rear side cover 45 (FIG. 1) is fixed is disposed on the upper portion of the muffler mounting portion 65. The lower portion of the rear side cover 45 is fixed to the cover fixing portion 65a while overlapping with the cover fixing portion 65a from the outside in the vehicle width direction.

The muffler 36 has a rear portion fastened to the rear portion of the rear frame 20 via the rear side fixing portion 56a.

The rear extension pipe 55 includes the catalyst cover 67 that covers the catalyst 57 disposed in the catalyst holder 55a from upward and sides.

The catalyst cover 67 is a plate-shaped member formed in an arc shape along the outer periphery of the catalyst holder 55a and is disposed at a position separated in the radial direction from the outer periphery of the catalyst holder 55a. The catalyst cover 67 is disposed over the substantially whole length of the catalyst holder 55a. The catalyst cover 67 is disposed above the muffler mounting portion 65.

The catalyst cover 67 at least covers the upper surface of the catalyst holder 55a and the outer surface of the upper portion of the catalyst holder 55a.

To the muffler body portion 56, a muffler cover 68 (FIG. 1) that covers the muffler body portion 56 from upward and the outer lateral sides are mounted.

With reference to FIG. 3 and FIG. 4, as viewed in the side view of the vehicle, the air cleaner box 41 is disposed in a space 70 surrounded by the main frame 16, the seat frame 19, and the rear frame 20. The air cleaner box 41 is disposed below the seat 14.

As viewed in the side view of the vehicle, the air cleaner box 41 is a box-shaped member formed so as to decrease in length in the up-down direction from the rear portion to the front portion of the air cleaner box 41. Except for a part on the rear end side, an upper surface portion 41a of the air cleaner box 41 extends substantially horizontal in the front-rear direction as viewed in the side view of the vehicle.

The air cleaner box 41 has an internal space partitioned by an air cleaner element 71 disposed in the air cleaner box 41 into a dirty side 72 on the rear portion side of the air cleaner box 41 and a clean side 73 on the front portion side of the air cleaner box 41.

As viewed in the side view of the vehicle, a rear surface portion 41b of the air cleaner box 41 is inclined upward to the rear (inclined downward to the front) so as to run along the upper portion of the front portion of the rear wheel 3. The air cleaner element 71 is a plate-shaped member that partitions the internal space of the air cleaner box 41 in the front-rear direction and disposed in a posture upward to the rear so as to be substantially parallel to the rear surface portion 41b in front of the rear surface portion 41b as viewed in the side view of the vehicle.

The dirty side 72, which is positioned at the rear of the air cleaner element 71, includes a tube-shaped duct 74 that introduces external air as intake air to the inside of the air cleaner box 41.

The clean side 73, which is positioned at the front of the air cleaner element 71, includes a connecting tube 75 that connects the air cleaner box 41 to the throttle body 40.

The intake air introduced from the duct 74 to the dirty side 72 passes through the air cleaner element 71 to be purified, flows in the clean side 73, flows to the throttle body 40 (FIG. 1) through the connecting tube 75, and is supplied to the cylinder portion 32 from the throttle body 40.

On an outer surface portion 41c in the vehicle width direction of the air cleaner box 41, an opening 76 (see FIG. 7) that opens to the outside in the vehicle width direction and a lid 77 that closes the opening 76 are provided. The lid 77 is attachable to/removable from the air cleaner box 41.

With the lid 77 removed, the air cleaner element 71 can be loaded or unloaded from the air cleaner box 41 through the opening 76.

Figure 7:
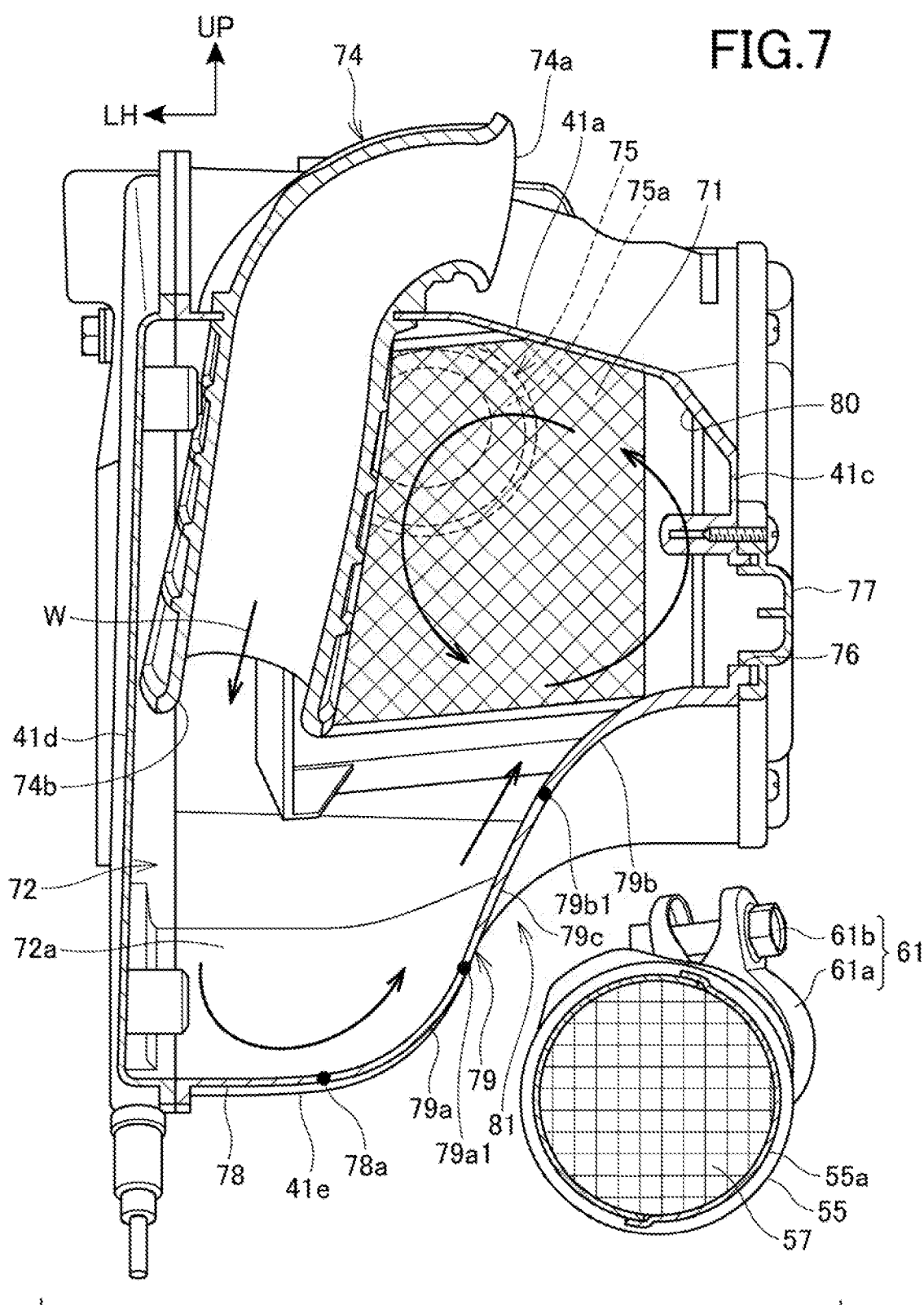
FIG. 7 is a cross-sectional view along VII-VII in FIG. 4.

FIG. 7 is a cross-sectional view along VII-VII in FIG. 4.

With reference to FIG. 4 and FIG. 7, when viewed from the rear side as in FIG. 7, an inner surface portion 41d in the vehicle width direction of the air cleaner box 41 extends up and down to be substantially vertical.

The duct 74 passes through the upper surface portion 41a on the clean side 73 side and extends downward inside the clean side 73.

The duct 74 is disposed close to the inner surface portion 41d side in the vehicle width direction inside the clean side 73 and closer to the inner surface portion 41d than the outer surface portion 41c. The duct 74 extends downward so as to run along the inner surface portion 41d. In detail, the duct 74 is slightly inclined so as to be close to the inner surface portion 41d toward downward.

As viewed in the side view of the vehicle, the duct 74 is inclined downward to the front so as to run along the rear surface portion 41b of the air cleaner box 41.

An inlet 74a of intake air disposed on the upper end portion of the duct 74 opens to the outside in the vehicle width direction.

An outlet 74b of intake air disposed on the lower end portion of the duct 74 opens downward. The outlet 74b of the duct 74 is positioned at the intermediate portion of the vertical height of the clean side 73.

A lower surface portion 41e of the air cleaner box 41 extends to the front and rear to be substantially horizontal as viewed in the side view of the vehicle.

As viewed in the side view of the vehicle, a front surface portion 41f of the air cleaner box 41 extends forward from the front edge of the lower surface portion 41e upward to the front and is connected to the upper surface portion 41a.

The lower surface portion 41e constitutes the lower surface portion of the dirty side 72 as viewed in the side view of the vehicle.

As viewed in the side view of the vehicle, the rear end portion of the front surface portion 41f constitutes the lower portion of a front surface portion 72a of the dirty side 72. As viewed in the side view of the vehicle, a part on the front side of the front surface portion 72a of the dirty side 72 in the front surface portion 41f of the air cleaner box 41 constitutes the lower surface portion of the clean side 73.

With reference to FIG. 7, the lower surface portion of the dirty side 72 includes a lower wall portion 78 and an outer wall portion 79. The lower wall portion 78 is positioned immediately below the outlet 74b of the duct 74 and opposed to the opening of the outlet 74b. The outer wall portion 79 extends outside in the vehicle width direction and upward from an outer edge portion 78a in the vehicle width direction of the lower wall portion 78. The inner edge portion in the vehicle width direction of the lower wall portion 78 is connected to the lower edge of the inner surface portion 41d. Note that positions of the outer edge portion 78a and an upper end 79a1 and a lower end 79b1 described later are indicated by black dots (black circles) in FIG. 7.

The lower wall portion 78 is substantially horizontal. The outer edge portion 78a of the lower wall portion 78 is a boundary between the lower wall portion 78 and the lower end of the outer wall portion 79. While the lower wall portion 78 extends substantially horizontal in the vehicle width direction in this embodiment, as long as the lower wall portion 78 is opposed to the opening of the outlet 74b, the lower wall portion 78 may be inclined or slightly curved.

The outlet 74b overlaps with the lower wall portion 78 from upward in plan view.

The outer wall portion 79 is positioned outside in the vehicle width direction and downward with respect to the outlet 74b of the duct 74.

The outer wall portion 79 extends outside in the vehicle width direction and upward from the outer edge portion 78a of the lower wall portion 78 and is connected to the lower edge of the outer surface portion 41c. The outer wall portion 79 is positioned below the air cleaner element 71 and the opening 76.

The outer wall portion 79 is an inclined surface inclined from the outer edge portion 78a outside in the vehicle width direction and upward.

When viewed entirely, the outer wall portion 79 curves so as to be positioned outside in the vehicle width direction toward upward.

The outer wall portion 79 constitutes a concave portion 81, which is a lower portion of a part outside in the vehicle width direction in the air cleaner box 41 depressed to the inside in the vehicle width direction and upward. The concave portion 81 is a part where the wall portion constituting an outer shell of the air cleaner box 41 is depressed to the inward of the air cleaner box 41.

In detail, the outer wall portion 79 includes a first curving portion 79a, a second curving portion 79b, and a connecting portion 79c. The first curving portion 79a rises from the outer edge portion 78a of the lower wall portion 78 outside in the vehicle width direction and upward. The second curving portion 79b is inflected with respect to the first curving portion 79a at the upper side of the first curving portion 79a and extends outside in the vehicle width direction and upward. The connecting portion 79c connects the upper end 79a1 of the first curving portion 79a and the lower end 79b1 of the second curving portion 79b.

The first curving portion 79a curves so as to increase the inclination toward upward. The center of the arc of the curve of the first curving portion 79a is inside in the vehicle width direction with respect to the outer wall portion 79.

The second curving portion 79b curves so as to decrease the inclination toward upward. The center of the arc of the curve of the second curving portion 79b is outside in the vehicle width direction with respect to the outer wall portion 79.

The connecting portion 79c linearly extends outside in the vehicle width direction and upward from the upper end 79a1 of the first curving portion 79a and is connected to the lower end 79b1 of the second curving portion 79b. Note that the upper end 79a1 of the first curving portion 79a may be directly connected to the lower end 79b1 of the second curving portion 79b without disposing the connecting portion 79c.

An upper side inclined surface 80 inclined to be positioned inside in the vehicle width direction toward upward is disposed on the upper portion of the outer surface portion 41c in the dirty side 72.

An intake air W flowing from the duct 74 to the dirty side 72 flows as indicated by the arrows illustrated in FIG. 7.

The intake air W suctioned from the inlet 74a to the duct 74 blows off to the lower side inside the dirty side 72 from the outlet 74b and contacts the lower wall portion 78 to be received.

The intake air W received by the lower wall portion 78 flows outside in the vehicle width direction and upward along the first curving portion 79a, the connecting portion 79c, and the second curving portion 79b. Here, since the first curving portion 79a curves, the intake air W in contact with the lower wall portion 78 can smoothly flow to the outside in the vehicle width direction and upward.

The intake air W that has flowed upward along the second curving portion 79b flows inside in the vehicle width direction so as to run along the wall surface of the upper portion of the dirty side 72, and the intake air W circles inside the upper portion of the dirty side 72. This promotes a mixture of the intake air W inside the dirty side 72 and ensures causing the intake air W to pass through over the whole air cleaner element 71. In view of this, the intake air W can be efficiently purified.

Figure 8:
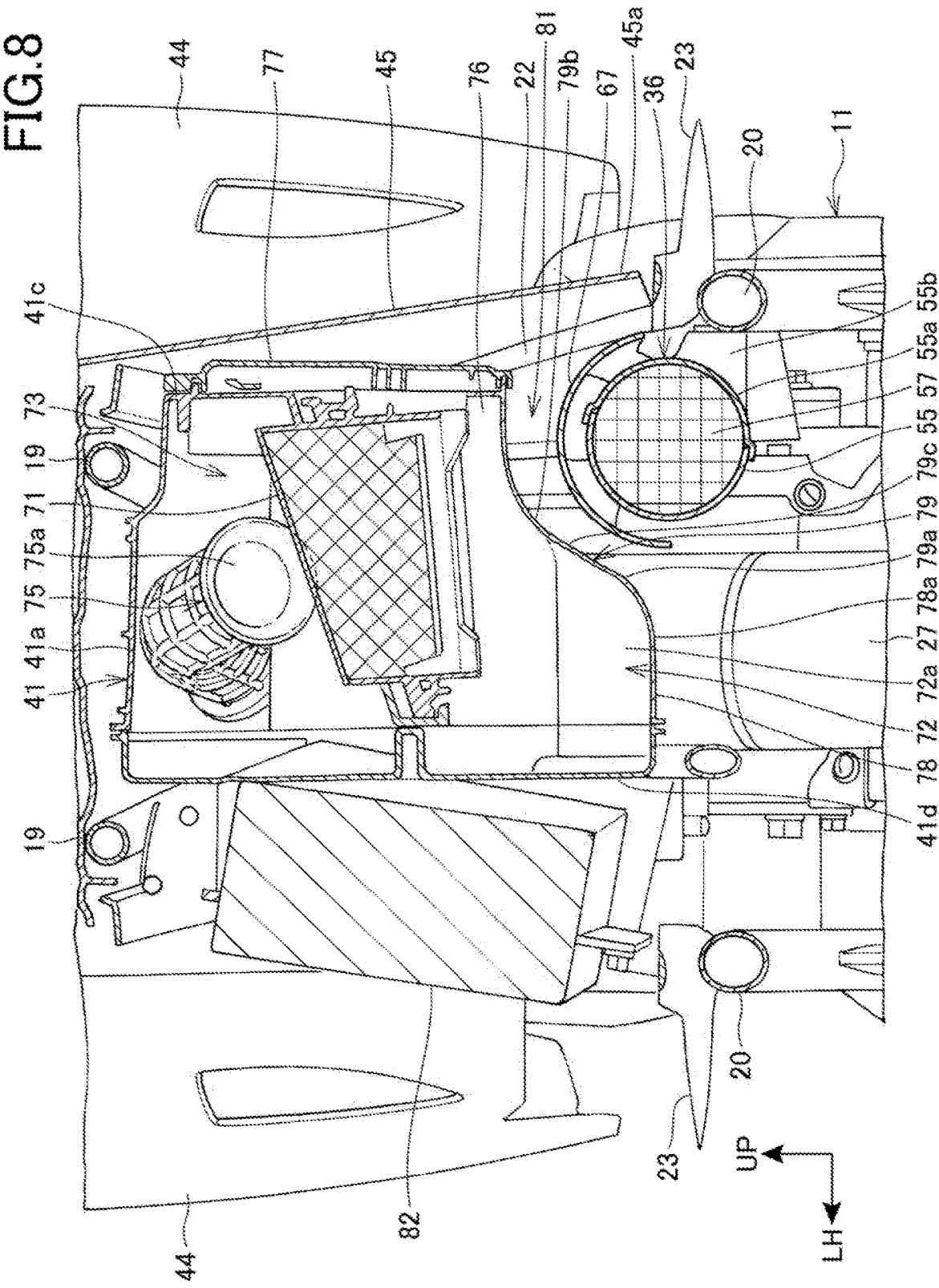
FIG. 8 is a cross-sectional view along VIII-VIII in FIG. 3.

FIG. 8 is a cross-sectional view along VIII-VIII of FIG. 3.

With reference to FIG. 4, FIG. 7, and FIG. 8, an inlet 75a of intake air of the connecting tube 75 opens at the inside of the clean side 73 and is opposed to the front surface of the air cleaner element 71.

The connecting tube 75 extends to the front of the air cleaner box 41 and has a front end connected to the throttle body 40.

The air cleaner box 41 is disposed below the right and left seat frames 19 and at the center of the vehicle width.

The catalyst 57 of the muffler 36 is disposed outside on one side in the vehicle width direction with respect to the air cleaner box 41 and overlaps with the air cleaner box 41 from the outside in the vehicle width direction.

A box-shaped battery 82 that supplies the engine 11 or the like of the motorcycle 1 with electric power is disposed outside on the other side in the vehicle width direction with respect to the air cleaner box 41 and overlaps with the air cleaner box 41 from the outside in the vehicle width direction.

By thus distributing and disposing the catalyst 57 and the battery 82, which have comparatively large weights, to the left and right of the air cleaner box 41, a weight balance between the left and right of the motorcycle 1 can be properly ensured.

With reference to FIG. 3, FIG. 4, FIG. 7, and FIG. 8, the catalyst 57 of the muffler 36 is disposed in the space 70 (FIG. 2, FIG. 3), which is surrounded by the main frame 16, the seat frame 19, and the rear frame 20 as viewed in the side view of the vehicle. The muffler 36 is fixed to the muffler stay 63 with the muffler fixing bolt 66 disposed in the space 70.

In detail, as viewed in the side view of the vehicle, the catalyst 57 is disposed inside in the vehicle width direction with respect to the pivot frame portion 22, the connecting portion 50, and the rear frame 20 in the lower portion of the space 70. The catalyst 57 is disposed rearward with respect to the pivot frame portion 22 and the step 49 (FIG. 1).

Additionally, as viewed in the side view of the vehicle, the front portion of the catalyst 57 overlaps with the rear suspension 27 from the outside in the vehicle width direction. As viewed in the side view of the vehicle, the rear portion of the catalyst 57 overlaps with the outer wall portion 79 of the lower portion of the air cleaner box 41 from the outside in the vehicle width direction.

By thus disposing the catalyst 57 at the rear of the pivot frame portion 22, the catalyst 57 can be separated from the leg of the occupant and thermal effect of the catalyst 57 to the occupant can be reduced. Additionally, in the space 70, using the space inside in the vehicle width direction of the body frame 10 and outside in the vehicle width direction of the rear suspension 27 and the outer wall portion 79 of the air cleaner box 41, the catalyst 57 can be disposed compactly.

Figure 9:
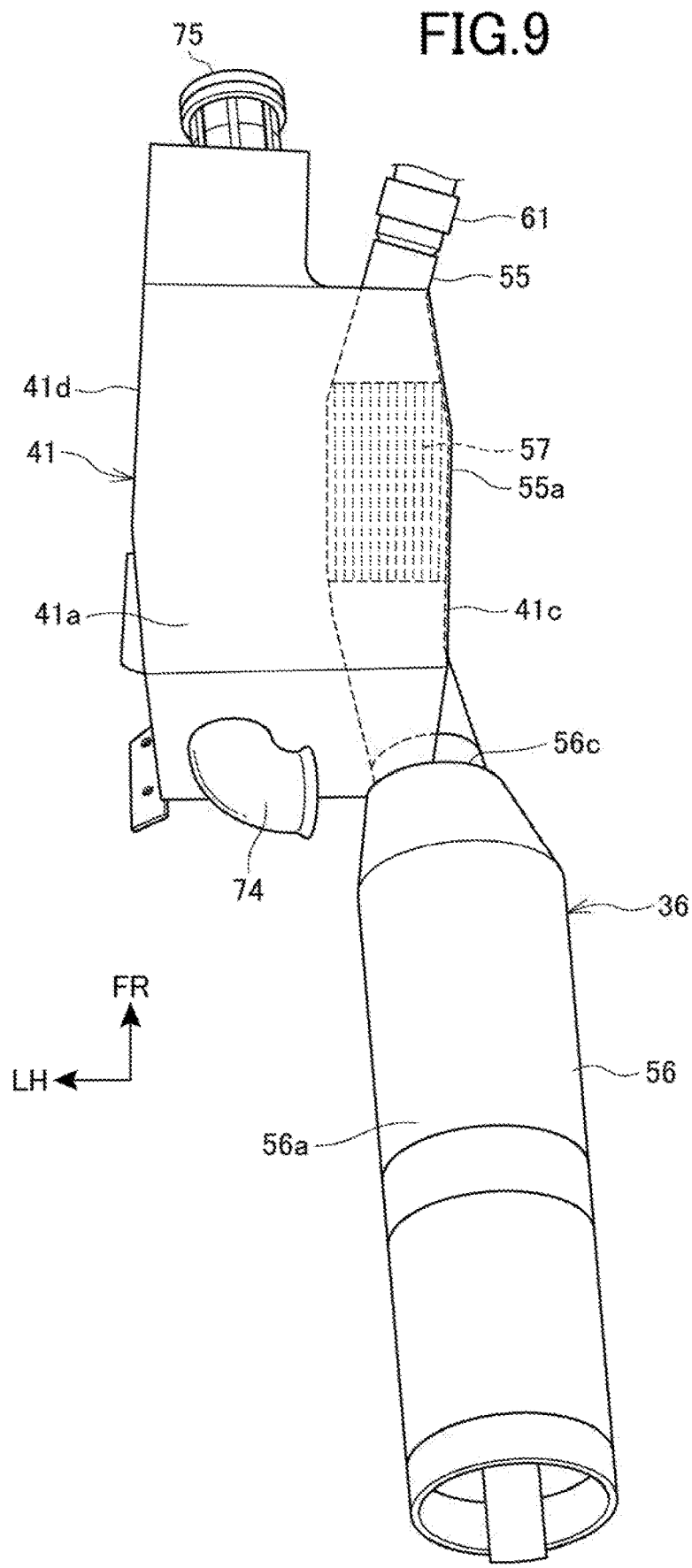
FIG. 9 is a plan view when an air cleaner box and the muffler are viewed from above.

FIG. 9 is a plan view when the air cleaner box 41 and the muffler 36 are viewed from upward.

With reference to FIG. 7 and FIG. 9, the catalyst 57 of the muffler 36 is disposed immediately below the second curving portion 79b of the outer wall portion 79 of the air cleaner box 41 and overlaps with the outer wall portion 79 from the lower side as seen in a plan view. Additionally, at least a part of the catalyst 57 (upper portion of the catalyst 57) is positioned upward of the lower wall portion 78 of the air cleaner box 41. That is, the upper portion of the catalyst 57 is disposed inside the concave portion 81 of the air cleaner box 41.

In view of this, using the space below and the outer lateral side of the outer wall portion 79, the catalyst 57 can be disposed compactly.

Further, the outer wall portion 79 curves so as to run along the outer shape of the arc shape of the upper portion of the catalyst holder 55a. In view of this, while the catalyst 57 is disposed below the outer wall portion 79, a capacity of the dirty side 72 can be largely ensured.

The opening 76 and the lid 77 of the air cleaner box 41 are disposed above the catalyst 57 in the space 70 as viewed in the side view of the vehicle. In view of this, when the air cleaner element 71 is loaded or unloaded through the opening 76, the catalyst 57 is less likely to be a hindrance, thereby providing good maintainability.

Since the muffler 36 includes the catalyst cover 67 (FIG. 3) that covers the catalyst 57, thermal effect to the occupant can be reduced by the catalyst cover 67.

With reference to FIG. 1 and FIG. 8, the rear side cover 45 is a vehicle body cover that covers the air cleaner box 41 from the outer lateral side. The rear side cover 45 includes an extending portion 45a that extends downward of the air cleaner box 41 at the lower portion, and the extending portion 45a covers the catalyst cover 67 from the outside in the vehicle width direction. In view of this, the thermal effect to the occupant can be effectively reduced by the catalyst cover 67 and the extending portion 45a.

The extending portion 45a covers and hides the muffler fixing bolt 66 and the front side fixing portion 55b from the outside in the vehicle width direction.

The tandem steps 23 (FIG. 1, FIG. 3) disposed at the lower portion of the rear frame 20 are positioned outside in the vehicle width direction with respect to the rear side cover 45. The tandem steps 23 overlap with the rear portion of the catalyst 57 from the outside in the vehicle width direction as viewed in the side view of the vehicle.

As described above, according to the embodiment to which the present invention is applied, the motorcycle 1 includes the body frame 10, the engine 11, the exhaust pipe 35, the muffler 36, and the catalyst 57. The body frame 10 includes the main frame 16 that extends rearward from the head pipe 15, the seat frame 19 that extends rearward from the main frame 16 and supports the seat 14 for occupant, and the rear frame 20 that extends from the main frame 16 upward to the rear and is connected to the seat frame 19. The engine 11 is supported to the body frame 10. The exhaust pipe 35 extends rearward of the vehicle from the exhaust port of the engine 11. The muffler 36 is connected to the rear end portion 35a of the exhaust pipe 35. The catalyst 57 is disposed in the muffler 36. The air cleaner box 41 that takes in the intake air supplied to the engine 11 is disposed rearward of the engine 11. The catalyst 57 disposed in the muffler 36 is disposed in the space 70 surrounded by the main frame 16, the seat frame 19, and the rear frame 20 and overlaps with the air cleaner box 41 as viewed in the side view of the vehicle.

With this configuration, as viewed in the side view of the vehicle, the catalyst 57 is disposed in the space 70 surrounded by the main frame 16, the seat frame 19, and the rear frame 20, and therefore the catalyst 57 can be disposed separately from the occupant. Furthermore, the catalyst 57 overlaps with the air cleaner box 41 as viewed in the side view of the vehicle, and therefore the catalyst 57 can be disposed compactly using the space at the side of the air cleaner box 41.

Additionally, the catalyst 57 overlaps with the air cleaner box 41 as seen in the plan view viewed in the vehicle up-down direction.

With this configuration, the catalyst 57 can be disposed compactly.

Additionally, the motorcycle 1 includes the body frame 10, the engine 11, the exhaust pipe 35, the muffler 36, and the catalyst 57. The body frame 10 includes the main frame 16 that extends rearward from the head pipe 15, the seat frame 19 that extends rearward from the main frame 16 and supports the seat 14 for occupant, and the rear frame 20 that extends from the main frame 16 upward to the rear and is connected to the seat frame 19. The engine 11 is supported to the body frame 10. The exhaust pipe 35 extends rearward of the vehicle from the exhaust port of the engine 11. The muffler 36 is connected to the rear end portion 35a of the exhaust pipe 35. The catalyst 57 is disposed in the muffler 36. The air cleaner box 41 that takes in the intake air supplied to the engine 11 is disposed rearward of the engine 11. The catalyst 57 disposed in the muffler 36 is disposed in the space 70 surrounded by the main frame 16, the seat frame 19, and the rear frame 20 as viewed in a side view of the vehicle and disposed in the concave portion 81 disposed in the air cleaner box 41.

With this configuration, as viewed in the side view of the vehicle, the catalyst 57 is disposed in the space 70 surrounded by the main frame 16, the seat frame 19, and the rear frame 20, and therefore the catalyst 57 can be disposed separately from the occupant. Furthermore, the catalyst 57 is disposed in the concave portion 81 disposed in the air cleaner box 41, and therefore the catalyst 57 can be disposed compactly using the space of the concave portion 81.

Additionally, the muffler 36 is fastened to the rear end portion 35a of the exhaust pipe with the fastening portion 60. The fastening portion 60 is disposed forward of the main frame 16 as viewed in the side view of the vehicle.

With this configuration, the main frame 16 is less likely to be the hindrance of the fastening portion of the muffler 36 and the assembly of the muffler 36 is good.

Furthermore, the air cleaner box 41 includes the duct 74. The duct 74 introduces the intake air to the inside of the air cleaner box 41. The air cleaner box 41 includes the lower wall portion 78 and the outer wall portion 79. The lower wall portion 78 receives the intake air introduced from the duct 74 to the air cleaner box 41. The outer wall portion 79 extends outside in the vehicle width direction and upward from the lower wall portion 78. The catalyst 57 is disposed below the outer wall portion 79.

With this configuration, the flow of the intake air introduced from the duct 74 to the air cleaner box 41 can be mixed by the lower wall portion 78 and the outer wall portion 79, and the intake air can efficiently flow inside the air cleaner box 41. Moreover, using the space below the outer wall portion 79, the catalyst 57 can be disposed compactly.

Additionally, the outer wall portion 79 curves so as to be positioned outside in the vehicle width direction toward upward.

With this configuration, since the outer wall portion 79 curves, the flow of the intake air can be efficiently mixed.

Additionally, the outer wall portion 79 includes the first curving portion 79a and the second curving portion 79b. The first curving portion 79a rises from the lower wall portion 78. The second curving portion 79b inflects upward of the first curving portion 79a and extends outside in the vehicle width direction. The first curving portion 79a curves so as to increase the inclination toward upward. The second curving portion 79b curves so as to decrease the inclination toward upward.

With this configuration, the first curving portion 79a and the second curving portion 79b allow efficiently flowing of the intake air inside the air cleaner box 41, and the space can be ensured at the side of the first curving portion 79a and the second curving portion 79b and therefore the catalyst 57 can be easily disposed.

Additionally, the catalyst 57 overlaps with the outer wall portion 79 from the outside in the vehicle width direction.

With this configuration, the catalyst 57 can be disposed compactly in the side of the outer wall portion 79.

Further, the air cleaner box 41 houses the air cleaner element 71 that purifies the intake air. The air cleaner box 41 includes the opening 76 and the lid 77. The opening 76 is configured to allow the air cleaner element 71 to be loaded or unloaded therethrough. The lid 77 closes the opening 76. The opening 76 is disposed above the catalyst 57 and opens to the outside in the vehicle width direction from the space 70.

With this configuration, the air cleaner element 71 can be loaded or unloaded from the air cleaner box 41 through the opening 76 above the catalyst 57 and therefore maintainability is good.

In the muffler 36, the second catalyst 58 is disposed rearward of the catalyst 57.

With this configuration, the exhaust air that has passed through the catalyst 57 passes through the second catalyst 58, and this allows efficiently purifying the exhaust air. The second catalyst 58 is positioned further rearward of the catalyst 57, and therefore the second catalyst 58 can be disposed far from the occupant.

Additionally, the catalyst cover 67 and the rear side cover 45 are disposed. The catalyst cover 67 covers the catalyst 57 from outside the muffler 36. The rear side cover 45 covers the air cleaner box 41 from the outside in the vehicle width direction. The rear side cover 45 includes the extending portion 45a that covers the catalyst cover 67 from the outside in the vehicle width direction.

With this configuration, since the rear side cover 45 that covers the air cleaner box 41 covers the catalyst cover 67, the heat of the catalyst 57 reaching to the occupant can be effectively reduced with the simple structure.

Note that the above-described embodiments are given to illustrate an aspect to which the present invention is applied, and the present invention is not limited to the above-described embodiment.

While it has been described that the outer wall portion 79 curves so as to be positioned outside in the vehicle width direction toward upward in the embodiment, the present invention is not limited to this configuration. The outer wall portion only needs to extend outside in the vehicle width direction and upward from the lower wall portion 78. For example, the outer wall portion may be an inclined surface portion that linearly extends outside in the vehicle width direction and upward from the lower wall portion 78. Additionally, the outer wall portion may be constituted by, for example, a longitudinal wall portion extending upward to be substantially vertical from the lower wall portion 78, and a wall portion extending outside in the vehicle width direction to be substantially horizontal from the upper end of this longitudinal wall portion.

Further, while the description has been given with the motorcycle 1 as the example of the saddle riding vehicle in the embodiment, the present invention is not limited to this configuration. The present invention is also applicable to a three-wheeled saddle riding vehicle including two front wheels or rear wheels, or a saddle riding vehicle including four or more wheels.

REFERENCE SIGNS LIST

1 . . . Motorcycle (saddle riding vehicle)
10 . . . Body frame
11 . . . Engine
14 . . . Seat
15 . . . Head pipe
16 . . . Main frame
20 . . . Rear frame
19 . . . Seat frame
35 . . . Exhaust pipe
35*a* . . . Rear end portion
36 . . . Muffler
41 . . . Air cleaner box
45 . . . Rear side cover (vehicle body cover)
45*a* . . . Extending portion
57 . . . Catalyst
58 . . . Second catalyst
60 . . . Fastening portion
67 . . . Catalyst cover
70 . . . Space
71 . . . Air cleaner element
74 . . . Duct
76 . . . Opening
77 . . . Lid
78 . . . Lower wall portion
79 . . . Outer wall portion
79*a* . . . First curving portion
79*b* . . . Second curving portion
81 . . . Concave portion

The invention claimed is:

1. A saddle riding vehicle comprising:
a body frame, the body frame including: a main frame that extends rearward from a head pipe; a seat frame that extends rearward from the main frame and supports a seat for occupant; and a rear frame that extends from the main frame upward to a rear and is connected to the seat frame;
an engine supported to the body frame;
an exhaust pipe that extends rearward of the vehicle from an exhaust port of the engine;
a muffler that is connected to a rear end portion of the exhaust pipe; and
a catalyst disposed in the muffler,
wherein an air cleaner box that takes in intake air supplied to the engine is disposed rearward of the engine,
the catalyst disposed in the muffler is disposed in a space surrounded by the main frame, the seat frame, and the rear frame and overlaps with the air cleaner box as viewed in a side view of the vehicle, and
the catalyst overlaps with the air cleaner box as seen in a plan view viewed in a vehicle up-down direction.

2. The saddle riding vehicle according to claim 1,
wherein the muffler is fastened to the rear end portion of the exhaust pipe with a fastening portion, and
the fastening portion is disposed forward of the main frame as viewed in the side view of the vehicle.

3. The saddle riding vehicle according to claim 1,
wherein the air cleaner box includes a duct, the duct introducing the intake air to inside the air cleaner box,
the air cleaner box includes a lower wall portion and an outer wall portion, the lower wall portion receiving the intake air introduced from the duct to the air cleaner box, the outer wall portion extending outside in a vehicle width direction and upward from the lower wall portion, and
the catalyst is disposed below the outer wall portion.

4. The saddle riding vehicle according to claim 3,
wherein the outer wall portion curves so as to be positioned outside in the vehicle width direction toward upward.

5. The saddle riding vehicle according to claim 4,
wherein the outer wall portion includes a first curving portion and a second curving portion, the first curving portion rising from the lower wall portion, the second curving portion inflecting upward of the first curving portion and extending outside in a vehicle width direction and upward, and
the first curving portion curves so as to increase an inclination toward upward, and the second curving portion curves so as to decrease an inclination toward upward.

6. The saddle riding vehicle according to claim 3,
wherein the catalyst overlaps with the outer wall portion from the outside in the vehicle width direction.

7. The saddle riding vehicle according to claim 1,
wherein the air cleaner box houses an air cleaner element that purifies the intake air,
the air cleaner box includes an opening and a lid, the opening being configured to allow the air cleaner element to be loaded or unloaded therethrough, the lid closing the opening, and
the opening is disposed above the catalyst and opens to outside in a vehicle width direction from the space.

8. The saddle riding vehicle according to claim 1,
wherein in the muffler, a second catalyst is disposed rearward of the catalyst.

9. The saddle riding vehicle according to claim 1,
wherein a catalyst cover and a body cover are disposed, the catalyst cover covering the catalyst from outside the muffler, the body cover covering the air cleaner box from outside in a vehicle width direction, and the body cover includes an extending portion that covers the catalyst cover from the outside in the vehicle width direction.

10. A saddle riding vehicle comprising:

a body frame, the body frame including: a main frame that extends rearward from a head pipe, a seat frame that extends rearward from the main frame and supports a seat for occupant, and a rear frame that extends from the main frame upward to a rear and is connected to the seat frame;

an engine supported to the body frame;

an exhaust pipe that extends rearward of the vehicle from an exhaust port of the engine;

a muffler that is connected to a rear end portion of the exhaust pipe; and a catalyst disposed in the muffler, wherein an air cleaner box that takes in intake air supplied to the engine is disposed rearward of the engine, and the catalyst disposed in the muffler is disposed in a space surrounded by the main frame, the seat frame, and the rear frame as viewed in a side view of the vehicle and disposed in a concave portion disposed in the air cleaner box.

* * * * *